(12) United States Patent
Adachi et al.

(10) Patent No.: US 6,768,067 B2
(45) Date of Patent: Jul. 27, 2004

(54) SWITCH DEVICE IN STEERING WHEEL AND STEERING WHEEL

(75) Inventors: Yukio Adachi, Aichi (JP); Kazuhiko Yoshikawa, Hiroshima-ken (JP); Yoshinori Otsubo, Hiroshima-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/697,678

(22) Filed: Oct. 29, 2003

(65) Prior Publication Data

US 2004/0084291 A1 May 6, 2004

(30) Foreign Application Priority Data

Nov. 1, 2002 (JP) ........................................ 2002-319531

(51) Int. Cl.[7] .............................. H01H 9/00; B60Q 1/26
(52) U.S. Cl. ..................... 200/61.54; 200/310; 362/487
(58) Field of Search ........................... 200/61.27–61.38, 200/61.54–61.57, 308–317, 5 R, 339; 307/10.1

(56) References Cited

U.S. PATENT DOCUMENTS 5,949,149 A * 9/1999 Shitanaka et al. ......... 307/10.1
6,525,283 B2 * 2/2003 Leng .......................... 200/339
6,548,772 B2 * 4/2003 Liburdi ..................... 200/61.54
2003/0231508 A1 * 12/2003 Ramamurthy et al. ...... 362/489

FOREIGN PATENT DOCUMENTS

JP 2001-354064 12/2001

* cited by examiner

Primary Examiner—James R Scott
(74) Attorney, Agent, or Firm—Sheridan Ross PC

(57) ABSTRACT

A switch device in a steering wheel includes a front switch assembly and a back switch. The front switch assembly is provided on a front side of the steering wheel that faces the driver, and rotates integrally with the steering wheel. The back switch is provided on a back side of the steering wheel. The front switch assembly includes at least one front switch. The front switch assembly also includes a circuit board. A front switch light source is provided on the circuit board. The front switch light source illuminates a switch marking provided on the front switch. On the circuit board is also provided a back switch light source for illuminating a switch marking provided on the back switch. Accordingly, a manipulation switch on the steering wheel is reliably illuminated regardless of the rotation angle of the steering wheel.

16 Claims, 6 Drawing Sheets

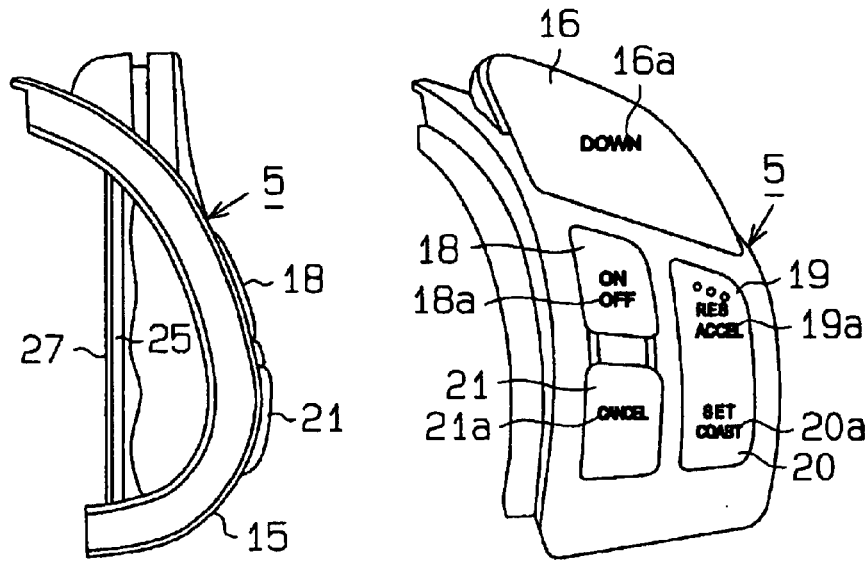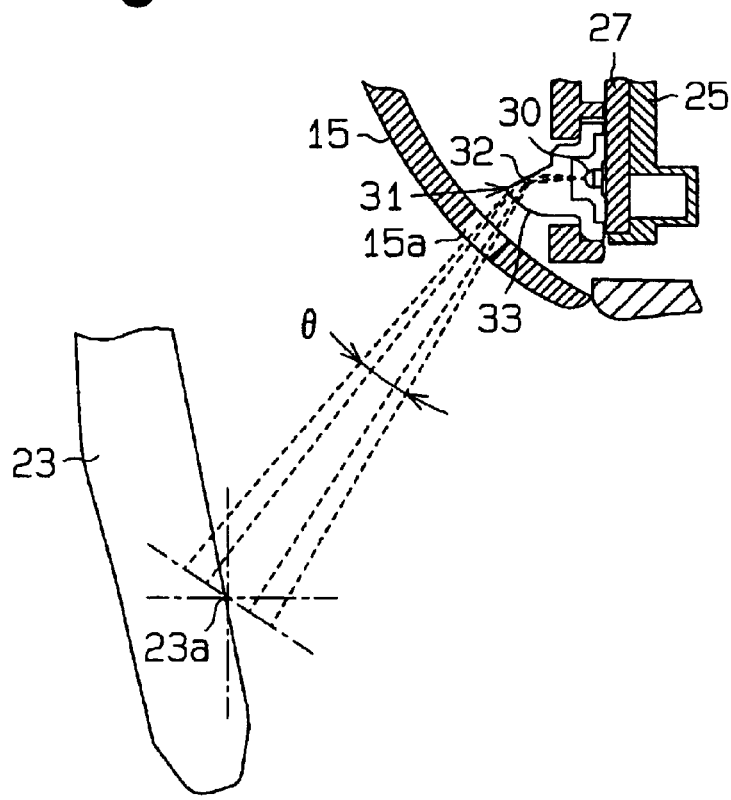

Fig.5(a) Fig.5(b)
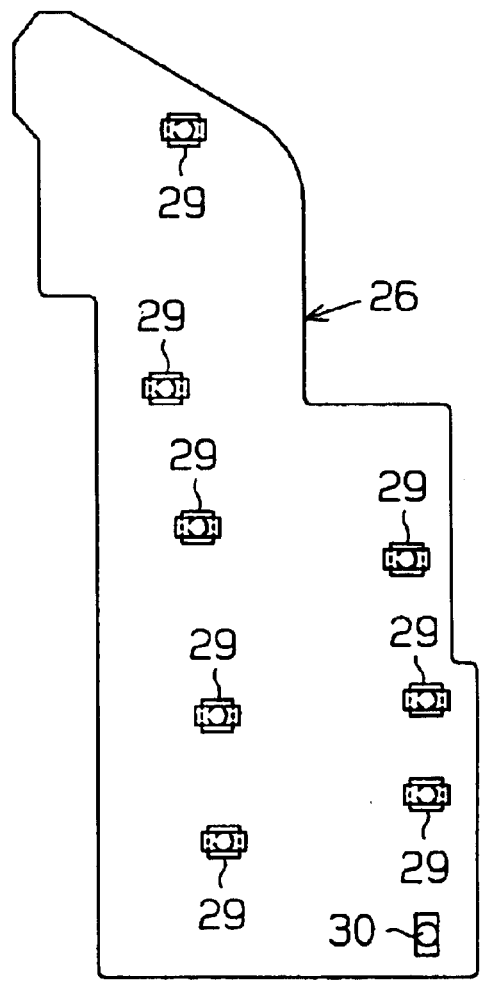
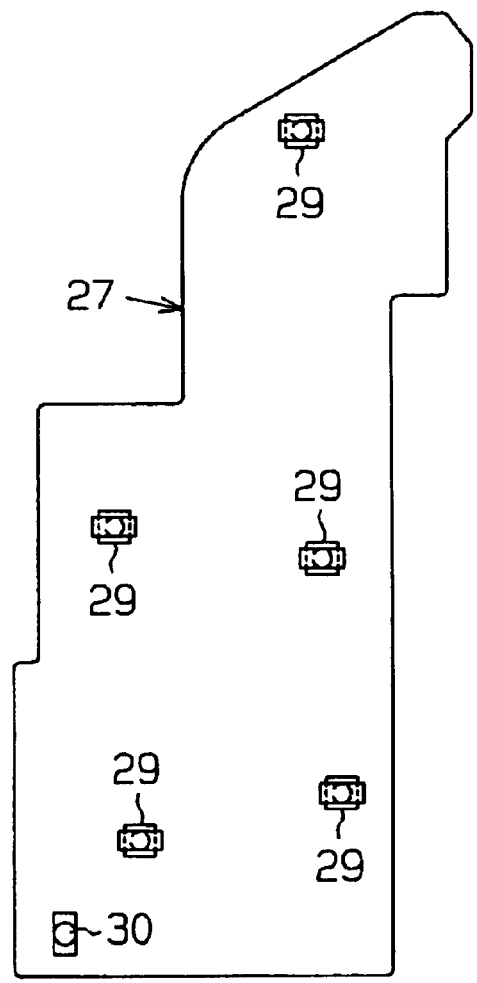
Fig.5(c)
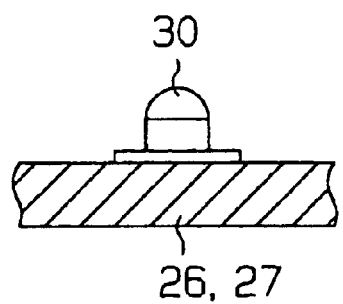

SWITCH DEVICE IN STEERING WHEEL AND STEERING WHEEL

BACKGROUND OF-THE-INVENTION

The present invention relates to a switch device in a steering wheel, and more particularly, to a technology for illuminating switch markings on manual switches on a steering wheel.

Typically, the switch device in a steering wheel includes front switches located on the front side of the steering wheel facing the driver (a downshift switch, an audio switch, and a cruise switch), and back switches located on the back side of the steering wheel that is opposite from the front side (an upshift switch). The front and back switches rotate integrally with the steering wheel.

In general, a switching marking provided on each front switch is made of a translucent resin. A light source is provided in each front switch. Light from each light source passes through the marking on the corresponding front switch and directly reaches the eyes of the driver. That is, each switch marking is directly illuminated by the corresponding light source.

For example, an upshift switch, which is a back switch, has a manipulation knob that extends from the back side of the steering wheel to a range visible to the driver. A switch marking is provided on the knob. If a light source for illuminating the switch marking is provided in the knob, the switch marking on the manipulation knob must be made of a translucent resin as in the case of the switch markings on the front switches. Further, the inside light source increases the size of the manipulation knob.

If the manipulation knob is plated with metal, the plated surface reflects natural light in daylight, which improves the visibility of the switch marking on the knob. Therefore, if only the use in daylight is considered, a compact knob having no inside light source may be applied. However, in this case, since the manipulation knob does not emit light, the visibility of the switch marking is low at night.

In Japanese Laid-Open Patent Publication No. 2001-354064, an illuminant is provided on a steering wheel to illuminate a column switch located in the vicinity of the steering wheel. A switch marking is provided on the column switch. Light emitted by the illuminant is reflected by the switch marking on the column switch and reaches the eyes of the driver.

The column switch is located on the dashboard of the vehicle and does not rotate integrally with the steering wheel. Thus, in the above mentioned publication, rotation of the steering wheel changes the relative positions of the illuminant rotated integrally with the steering wheel and the column switch. Therefore, the illuminant illuminates the switch marking on the column switch only in a part of the permitted rotation angle range of the steering wheel. In the remainder of the permitted rotation angle range, the illuminant is incapable of reliably illuminating the switch marking.

SUMMARY OF THE INVENTION

Accordingly, it is an objective of the present invention to reliably illuminate a manipulation switch on a steering wheel regardless of the rotation angle of the steering wheel.

To achieve the above objective, the present invention provides a switch device in a steering wheel of a vehicle. The steering wheel has a front side facing a driver of the vehicle and a back side opposite from the front side. The switch device includes a front switch assembly that is on the steering wheel to rotate integrally with the steering wheel. The front switch assembly has a front switch facing the same direction as the front side of the steering wheel. A back switch is provided on the steering wheel to rotate integrally with the steering wheel. The back switch is located at a position closer to the back side of the steering wheel than the front switch assembly. A switch marking is provided on the back switch. The switch marking faces the same direction as the front side of the steering wheel. A back switch light source is provided in the front switch assembly. The back switch light source illuminates the switch marking.

According to another aspect of the invention, a steering wheel of a vehicle that has a front side facing a driver of the vehicle and a back side opposite from the front side is provided. The steering wheel includes a front switch assembly that is provided on the steering wheel to rotate integrally with the steering wheel. The front switch assembly has a front switch facing the same direction as the front side of the steering wheel. A switch marking is provided on the front switch. A back switch is provided on the steering wheel to rotate integrally with the steering wheel. The back switch is located at a position closer to the back side of the steering wheel than the front switch assembly. A switch marking is provided on the back switch. The switch marking faces the same direction as the front side of the steering wheel. A front switch light source illuminates the switch marking on the front switch. A back switch light source illuminates the switch marking on the back switch. A circuit board is provided in the front switch assembly. The front switch light source and the back switch light source are provided on the circuit board.

In addition, present invention may be applicable to provide a switch device in a steering wheel of a vehicle. The steering wheel has a front side facing a driver of the vehicle and a back side opposite from the front side. The switch device includes a front switch that is provided on the front side of the steering wheel to rotate integrally with the steering wheel. A back switch is provided on the steering wheel to rotate integrally with the steering wheel. The back switch is located at a position closer to the back side of the steering wheel than the front switch. A switch marking is provided on the back switch. The switch marking faces the same direction as the front side of the steering wheel. A back switch light source is provided in the steering wheel to rotate integrally with the steering wheel. The back switch light source illuminates the switch marking.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3(a) is a front view illustrating a right front switch assembly located in a right section of the steering wheel shown in FIG. 1(a);

FIG. 3(b) is a cross-sectional left view, with a part cut away, showing the right front switch assembly of FIG. 3(a);

FIG. 3(c) is an enlarged partial cross-sectional view illustrating a state in which a light source for a right back switch provided in the right front switch assembly of FIG. 3(a) is illuminating the right back switch provided in a right section of the steering wheel;

FIG. 5(a) is a diagrammatic rear view illustrating the left circuit board of FIG. 4(a);

FIG. 5(b) is a diagrammatic rear view illustrating the right circuit board of FIG. 4(b);

FIG. 5(c) is a partial cross-sectional view illustrating a light source for back switch located on each circuit board;

DETAILED DESCRIPTION OF THE PREFERRED EMBODIMENT

One embodiment of the present invention will now be described with reference to the drawings.

Figure 1A:
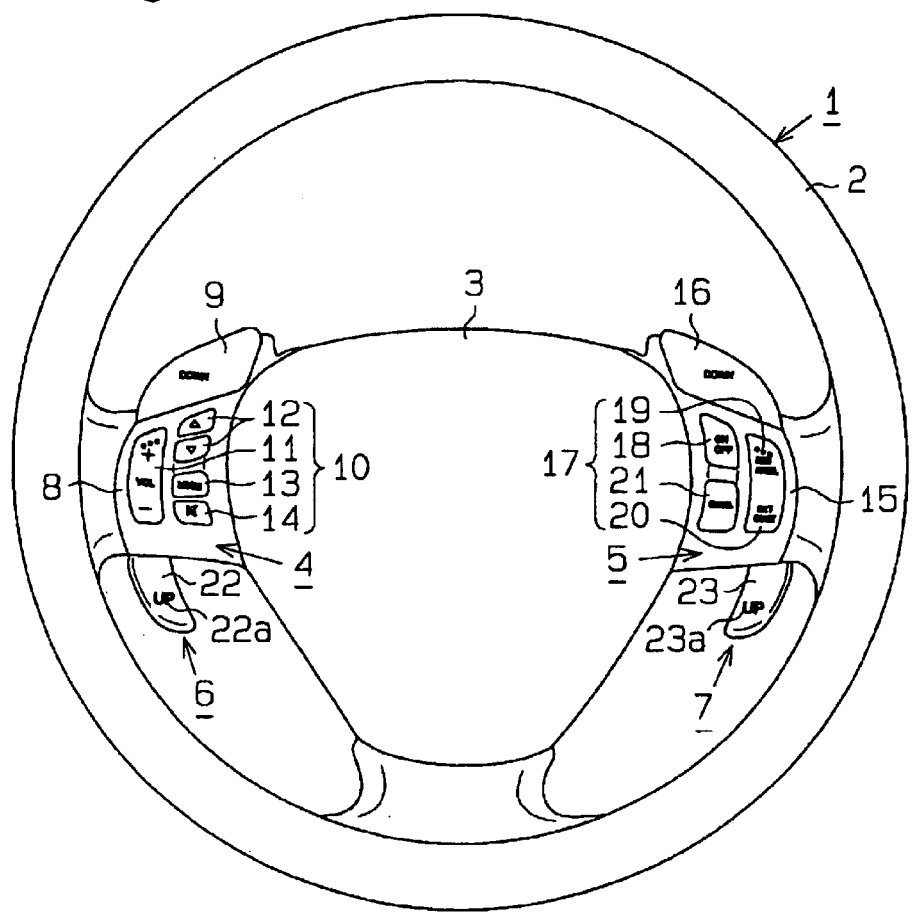
FIG. 1(a) is a front view illustrating a steering wheel according to one embodiment of the present invention.
Figure 1B:
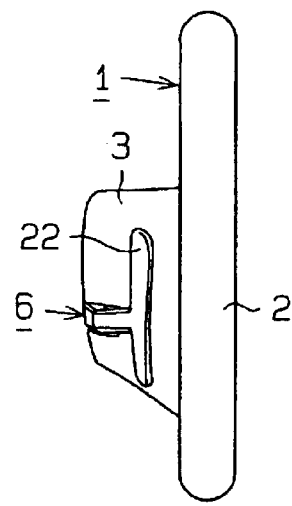
FIG. 1(b) is a left side view showing the steering wheel of FIG. 1(a)
Figure 1C:
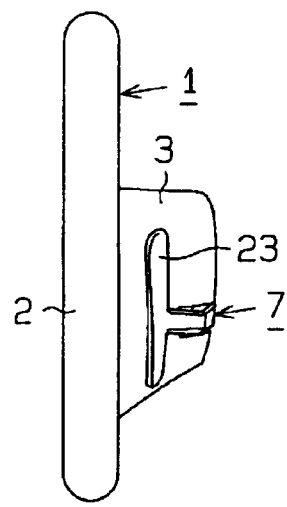
FIG. 1(c) is a right side view showing the steering wheel of FIG. 1(a)

A steering wheel 1 shown in FIGS. 1(a), 1(b), and 1(c) includes a ring portion 2 and a boss portion 3, which rotate integrally with the steering wheel 1. On the front side of the steering wheel, which faces the driver and between the ring portion 2 and the boss portion 3 are provided a left front switch assembly 4 and a right front switch assembly 5. The left front switch assembly 4 is located in a left front section of the steering wheel 1. The right front switch assembly 5 is located in a right front section of the steering wheel 1. Both switch assemblies 4, 5 rotate integrally with the steering wheel 1.

On the left and right sides of the boss portion 3 are located left back switch 6 and a right back switch 7, respectively. The back switches 6, 7 face the back side of the ring portion 2. That is, the left back switch 6 is located in a back left section of the steering wheel 1, and the right back switch 7 is located in a back right section of the steering wheel 1. Both back switches 6, 7 rotate integrally with the boss portion 3.

The left front switch assembly 4 has a case 8. On the surface of the case 8 (on a side facing the driver) are exposed a left downshift switch 9 and an audio switch group 10. The left downshift switch 9 is used for downshifting a transmission of the vehicle. The audio switch group 10 includes a volume switch 11, a tuning switch 12, a mode switch 13, and a mute switch 14.

Figure 2A:
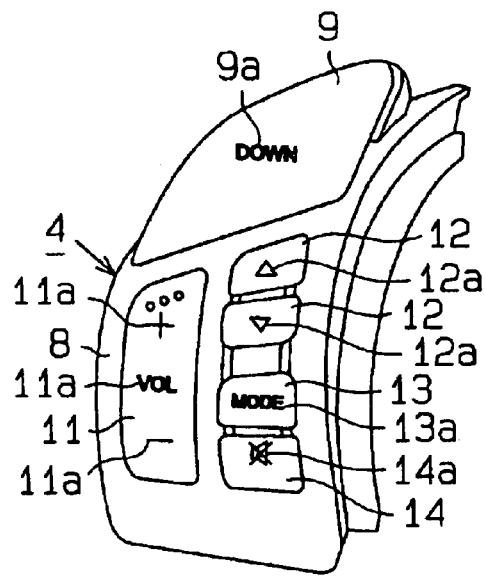
FIG. 2(a) is a front view illustrating a left front switch assembly located in a left section of the steering wheel shown in FIG. 1(a)

The right front switch assembly 5 has a case 15. On the surface of the case 15 (on a side facing the driver) are exposed a right downshift switch 16, which is similar to the left downshift switch 9, and a cruise switch group 17. The cruise switch group 17 includes a power switch 18, an acceleration switch 19, a speed setting switch 20, and a setting cancel switch 21. As shown in FIGS. 2(a) and 3(a), switch markings 9a, 11a, 12a, 13a, 14a, 16a, 18a, 19a, 20a, and 21a are provided on the switches 9, 11, 12, 13, 14, 16, 18, 19, 20, and 21, respectively. The switch markings 9a, 11a–14a, 16a, and 18a–21a are made of a translucent resin.

As shown in FIGS. 1(a) to 1(c), the back switches 6, 7 are both upshift switches for upshifting the transmission. The back switches 6, 7 include manipulation knobs 22, 23. Each of the manipulation knobs 22, 23 extends from the boss portion 3 to be located behind the corresponding one of the front switch assemblies 4, 5. The distal ends of the manipulation knobs 22, 23 extend to a visible range of the driver. Switch markings 22a, 23a are provided on the surfaces (sides facing the driver) of the distal portion of the knobs 22, 23, respectively.

Figure 2B:
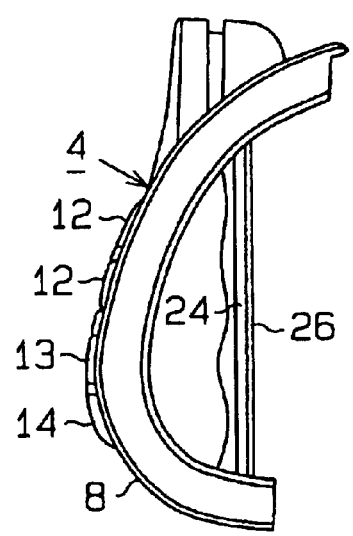
FIG. 2(b) is a cross-sectional right view, with a part cut away, showing the left front switch assembly of FIG. 2(a)

As shown in FIGS. 2(b) and 3(b), the rubber elastic plates 24, 25 and circuit boards 26, 27 are accommodated in the cases 8, 15 of the front switch assemblies 4, 5, respectively. The plates 24, 25 are piled with the circuit boards 26, 27, respectively. Although not illustrated, pressing with a hand any of the switches 9, 11–14, 16, 18–21 against the elastic force of the corresponding one of the elastic plates 24, 25 causes a movable contact of the pressed switch 9, 11–14, 16, 18–21 to contact a fixed contact provided on the corresponding circuit board 26, 27. Releasing the pressed switch 9, 11–14, 16, 18–21 permits the movable contact to be separated from the fixed contact by the elastic force of the corresponding one of the elastic plates 24, 25.

When any of the manipulation knobs 22, 23 of the back switches 6, 7 is pivoted toward the ring portion 2, or toward the driver, a fixed contact contacts a movable contact of the corresponding one of the back switch 6, 7. When released, the pivoted one of the knobs 22, 23 is pivoted away from the ring portion 2, and the corresponding contacts are separated from each other.

Figure 4A:
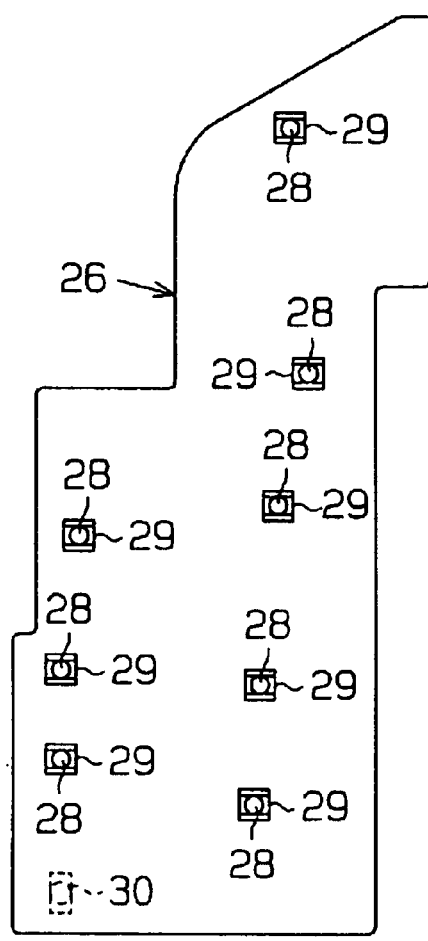
FIG. 4(a) is a diagrammatic front view illustrating a left circuit board located in the left front switch assembly of FIG. 2(a)
Figure 4B:
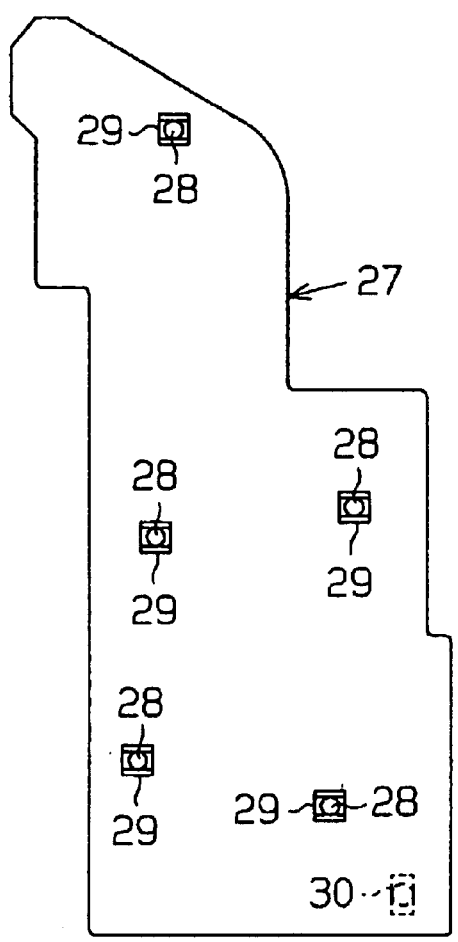
FIG. 4(b) is a diagrammatic front view illustrating a right circuit board located in the right front switch assembly of FIG. 3(a)
Figure 4C:
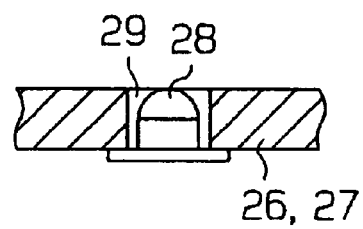
FIG. 4(c) is a partial cross-sectional view illustrating a light source for front switch located on each circuit board.

As shown in FIGS. 4(a) and 4(b), each of the circuit boards 26, 27 has front switch light sources 28 (for example, LEDs) for the switches 9, 11–14, 16, 18–21. Each front switch light source 28 corresponds to one of the switches 9, 11–14, 16, and 18–21. Each front switch light source 28, as shown in FIG. 4(c), is embedded in one of holes 29 formed in the circuit boards 26, 27, and facing the same direction as the front side of the steering wheel 1.

When a light switch provided in the passenger compartment (not shown) is turned on, the front switch light sources 28 glow. Light emitted by the light sources 28 passes through the elastic plates 24, 25 (or through holes formed in the elastic plates 24, 25), and directly illuminates the switch markings 9a, 11a–14a, 16a, 18a–21a.

As shown in FIGS. 5(a) and 5(b), each of the circuit boards 26, 27 has a rear switch light source 30. (for example, an LED) for the manipulation knob 22, 23. Each rear switch light source 30, as shown in FIG. 5(c), projects from the corresponding one of the circuit boards 26, 27, and faces the same direction as the back side of the steering wheel 1. When the light switch (not shown) is turned on, the back switch light sources 30 glow.

Figure 2C:
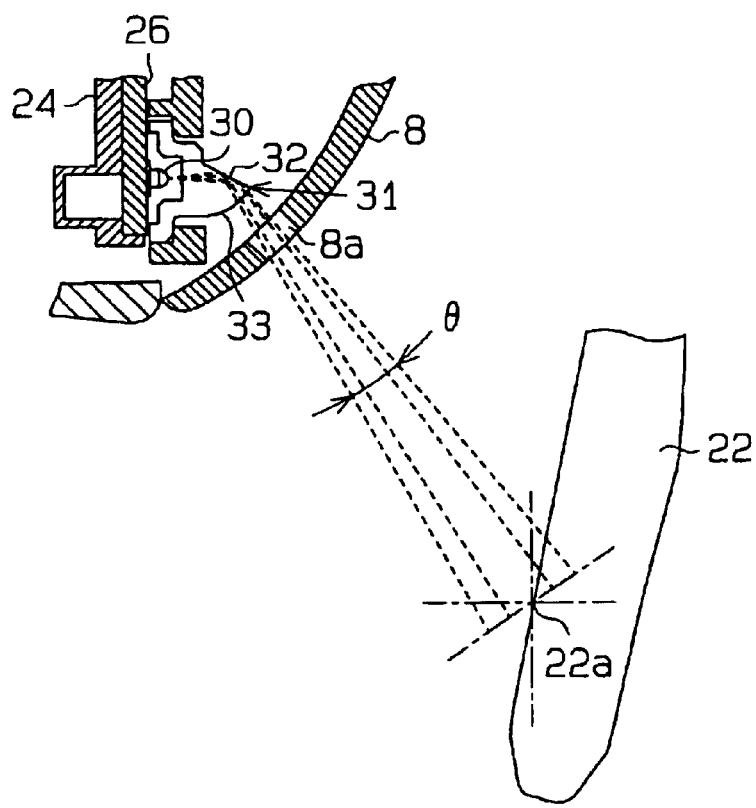
FIG. 2(c) is an enlarged partial cross-sectional view illustrating a state in which a light source for a left back switch provided in the left front switch assembly of FIG. 2(a) is illuminating the left back switch provided in a left section of the steering wheel.

As shown in FIGS. 2(c) and 3(c), a light guide 31 is provided on each of the circuit boards 26, 27 to cover the corresponding light source 30, and through holes 8a, 15a are formed in the cases 8, 15, respectively. Light emitted by each light source 30 passes through the corresponding light guide 31 and the corresponding one of the through holes 8a, 15a, and illuminates the corresponding one of the switch markings 22a, 23a on the manipulation knobs 22, 23.

Figure 6A:
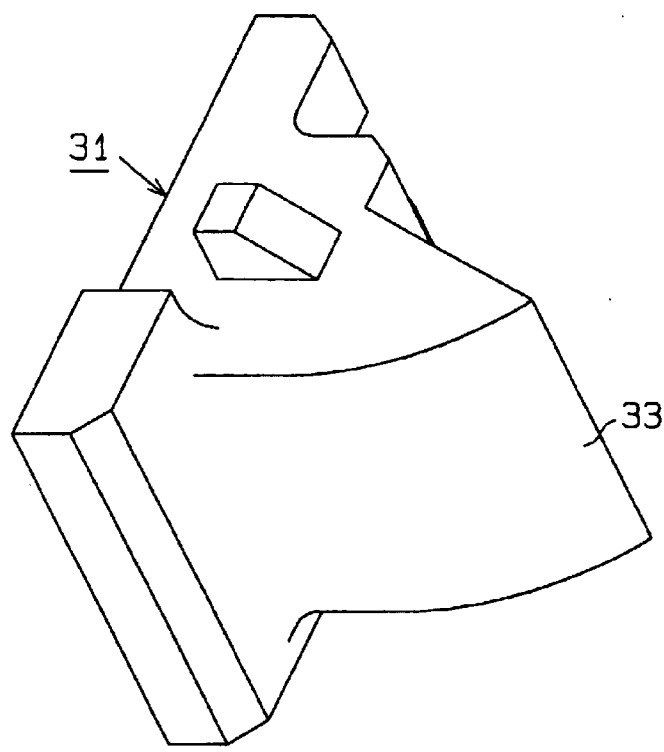
FIG. 6(a) is a perspective view illustrating a light guide provided in each switch assembly.
Figure 6B:
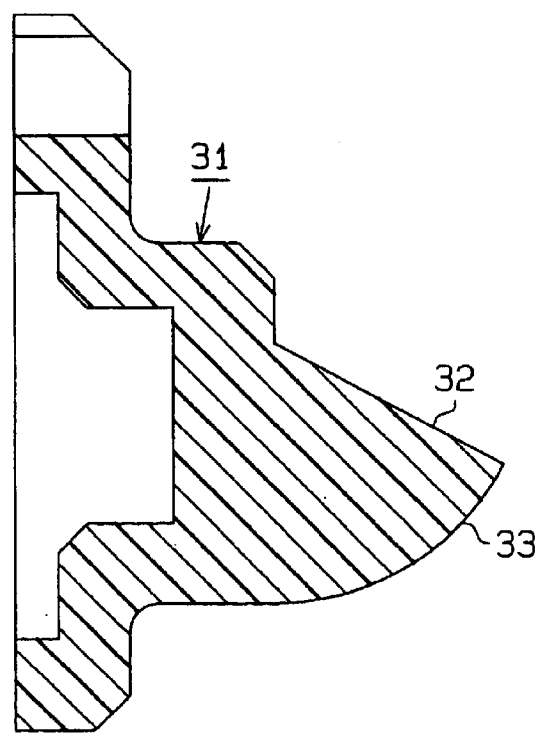
FIG. 6(b) is a cross-sectional view illustrating the light guide of FIG. 6(a).

The light guide 31 is illustrated in FIGS. 6(*a*) and 6(*b*) in detail. The light guide 31 is made of a translucent material and has a flat refractive surface 32 and a curved light projecting surface 33. Light emitted by each light source 30 enters the interior of the corresponding light guide 31, is refracted by the refraction surface 32, and heads for the light projecting surface 33. The light projecting surface 33 widens a projection angle θ of emitted light. The light projecting surface 33 is shaped as a part of a sphere that bulges toward the corresponding one of the switch-markings 22a, 23a.

The above described embodiment provides the following advantages.

The back switch light sources 30 are located in the front switch assemblies 4, 5. Therefore, the relative positions of the back switch light sources 30 and the corresponding switch markings 22a, 23a of the back switches 6, 7 are maintained regardless of the rotation angle position of the steering wheel 1. Accordingly, the switch markings 22a, 23a of the back switches 6, 7 and areas about the markings 22a, 23 are continuously and reliably illuminated by the back switch light sources 30.

The back switch light sources 30 are provided on the conventional circuit boards 26, 27, on which the front switch light sources 28 are provided. Therefore, the wiring and installation of the light sources 28, 30 are simplified.

Each of the switch assemblies 4, 5 has the light guide 31 having the refraction surface 32. The refraction surfaces 32 refract light emitted by the back switch light sources 30 so that the light heads for the switch markings 22a, 23a. This configuration permits the back switch light sources 30 to be arranged in a relatively wide range in relation to the positions of the switch markings 22a, 23a.

Each light guide 31 has the light projecting surface 33, which widens the projection angle θ of light heading for the switch marking 22a, 23a. Therefore, the back switch light sources 30 reliably illuminate the switch markings 22a, 23a and a relatively large area about the markings 22a, 23a.

The manipulation knobs 22, 23 of the back switches 6, 7 extend from the boss portion 3 to be located behind the front switch assemblies 4, 5. Although the switch markings 22a, 23a are provided on the manipulation knobs 22, 23, respectively, the light sources 30 are not located in the manipulation knobs 22, 23. Accordingly, the sizes of the manipulation knobs 22, 23 can be reduced.

The manipulation knobs 22, 23 may be plated with metal. In this case, natural light is reflected by the plated surface of the manipulation knobs 22, 23 in daylight. Light emitted by the light sources 30 is reflected by the plated surfaces at night. Thus, the visibility of the switch markings 22a, 23a on the manipulation knobs 22, 23 are improved at any time of day or night.

The present embodiment is to be considered as illustrative and not restrictive and the invention is not to be limited to the details given herein, but may be modified within the scope and equivalence of the appended claims.

What is claimed is:

1. A switch device in a steering wheel of a vehicle, wherein the steering wheel has a front side facing a driver of the vehicle and a back side opposite from the front side, the switch device comprising:

a front switch assembly that is provided on the steering wheel to rotate integrally with the steering wheel, wherein the front switch assembly has a front switch facing the same direction as the front side of the steering wheel;

a back switch that is provided on the steering wheel to rotate integrally with the steering wheel, wherein the back switch is located at a position closer to the back side of the steering wheel than the front switch assembly;

a switch marking provided on the back switch, wherein the switch marking faces the same direction as the front side of the steering wheel; and a back switch light source provided in the front switch assembly, wherein the back switch light source illuminates the switch marking.

2. The switch device according to claim 1, wherein the front switch has a switch marking, wherein the front switch assembly has a circuit board and a front switch light source for illuminating the switch marking of the front switch, and wherein the front switch light source and the back switch light source are located on the circuit board.

3. The switch device according to claim 1, wherein the front switch assembly includes a light guide, and wherein the light guide has a refractive surface that refracts light emitted by the back switch light source such that the light heads for the switch marking.

4. The switch device according to claim 1, wherein the front switch assembly includes a light guide, and wherein the light guide has a light projecting surface that widens a projection angle of light that is emitted by the back switch light source and heads for the switch marking.

5. The switch device according to claim 4, wherein the light projecting surface is shaped as a part of a sphere that bulges toward the switch marking.

6. The switch device according to claim 1, wherein the back switch light source is a light-emitting diode (LED).

7. The switch device according to claim 1, wherein the back switch includes a manipulation knob, wherein the manipulation knob extends from a boss portion of the steering wheel such that the knob is behind the front switch, and wherein the switch marking is provided on the knob.

8. The switch device according to claim 1, wherein the back switch is plated with metal.

9. A steering wheel of a vehicle, the steering wheel having a front side facing a driver of the vehicle and a back side opposite from the front side, the steering wheel comprising:

a front switch assembly that is provided on the steering wheel to rotate integrally with the steering wheel, wherein the front switch assembly has a front switch facing the same direction as the front side of the steering wheel;

a switch marking provided on the front switch;

a back switch that is provided on the steering wheel to rotate integrally with the steering wheel, wherein the back switch is located at a position closer to the back side of the steering wheel than the front switch assembly;

a switch marking provided on the back switch, wherein the switch marking faces the same direction as the front side of the steering wheel;

a front switch light source for illuminating the switch marking on the front switch;

a back switch light source for illuminating the switch marking on the back switch; and a circuit board provided in the front switch assembly, wherein the front switch light source and the back switch light source are provided on the circuit board.

10. The steering wheel according to claim 9, wherein the front switch assembly includes a light guide, and wherein the light guide has a refractive surface that refracts light emitted by the back switch light source such that the light heads for the switch marking on the back switch.

11. The steering wheel according to claim 9, wherein the front switch assembly includes a light guide, and wherein the light guide has a light projecting surface that widens a projection angle of light that is emitted by the back switch light source and heads for the switch marking on the back switch.

12. The steering wheel according to claim 11, wherein the light projecting surface is shaped as a part of a sphere that bulges toward the switch marking.

13. The steering wheel according to claim 9, wherein the front switch light source and the back switch light source are light-emitting diodes (LEDs).

14. The steering wheel according to claim 9, wherein the back switch includes a manipulation knob, wherein the manipulation knob extends from a boss portion of the steering wheel such that the knob is behind the front switch, and wherein the switch marking on the back switch is provided on the knob.

15. The steering wheel according to claim 9, wherein the back switch is plated with metal.

16. A switch device in a steering wheel of a vehicle, wherein the steering wheel has a front side facing a driver of the vehicle and a back side opposite from the front side, the switch device comprising:
- a front switch that is provided on the front side of the steering wheel to rotate integrally with the steering wheel;
- a back switch that is provided on the steering wheel to rotate integrally with the steering wheel, wherein the back switch is located at a position closer to the back side of the steering wheel than the front switch;
- a switch marking provided on the back switch, wherein the switch marking faces the same direction as the front side of the steering wheel; and
- a back switch light source that is provided in the steering wheel to rotate integrally with the steering wheel, wherein the back switch light source illuminates the switch marking.

* * * * *